(12) United States Patent  (10) Patent No.: US 7,560,907 B2
Nelson  (45) Date of Patent: Jul. 14, 2009

(54) CHARGING SYSTEM FOR FIELD DEVICES

(75) Inventor: Richard L. Nelson, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 107 days.

(21) Appl. No.: 11/414,491

(22) Filed: Apr. 28, 2006

(65) Prior Publication Data

US 2006/0244424 A1 Nov. 2, 2006

Related U.S. Application Data

(60) Provisional application No. 60/675,647, filed on Apr. 28, 2005.

(51) Int. Cl.
| | |
|---|---|
| *H02H 7/06* | (2006.01) |
| *H02P 9/00* | (2006.01) |
| *H02P 11/00* | (2006.01) |
| *H02J 7/04* | (2006.01) |
| *H02J 7/16* | (2006.01) |
| *H02J 7/00* | (2006.01) |
| *H02J 9/00* | (2006.01) |

(52) U.S. Cl. .................. 322/37; 320/148; 320/161; 307/66

(58) Field of Classification Search ............ 320/148, 320/161; 322/37; 307/66
See application file for complete search history.

(56) References Cited

U.S. PATENT DOCUMENTS

| | | | | |
|---|---|---|---|---|
| 1,392,096 A | * | 9/1921 | Wagner | 52/642 |
| 2,976,473 A | * | 3/1961 | Shaw et al. | 322/28 |
| 3,911,350 A | * | 10/1975 | Swope | 320/154 |
| 4,233,553 A | * | 11/1980 | Prince et al. | 320/146 |
| 4,275,344 A | * | 6/1981 | Mori et al. | 322/28 |
| 4,287,465 A | * | 9/1981 | Godard et al. | 320/101 |
| 4,315,163 A | * | 2/1982 | Bienville | 307/66 |
| 4,383,211 A | | 5/1983 | Staler | 320/102 |
| 4,433,277 A | * | 2/1984 | Carollo et al. | 320/149 |
| 4,636,706 A | * | 1/1987 | Bowman et al. | 322/28 |

(Continued)

FOREIGN PATENT DOCUMENTS

DE 201 07 116 8/2001

(Continued)

OTHER PUBLICATIONS

Singh et al., "Micropower Supply for Sensors," IEEE International Conference on Sensors, Oct. 22, 2003, pp. 600-605.

(Continued)

*Primary Examiner*—Quyen P Leung
*Assistant Examiner*—Pedro J Cuevas
(74) *Attorney, Agent, or Firm*—Christopher R. Christenson; Westman, Champlin & Kelly P.A.

(57) ABSTRACT

A charging circuit for field devices is disclosed. The circuit has at least three modes and automatically shifts between the modes depending on voltage of the generator. In a first mode, the charging circuit provides voltage regulation. In a second mode, the charging circuit couples the generator directly to en energy storage device. In a third mode, the charging circuit decouples the generator from the storage device. A field device utilizing the charging circuit is also disclosed.

20 Claims, 8 Drawing Sheets

U.S. PATENT DOCUMENTS

| | | | | |
|---|---|---|---|---|
| 5,028,859 | A * | 7/1991 | Johnson et al. | 320/125 |
| 5,111,131 | A * | 5/1992 | Somerville | 320/160 |
| 5,121,047 | A * | 6/1992 | Goedken et al. | 320/160 |
| 5,122,722 | A * | 6/1992 | Goedken et al. | 320/116 |
| 5,166,595 | A * | 11/1992 | Leverich | 320/139 |
| 5,229,705 | A * | 7/1993 | Kato | 320/148 |
| 5,270,636 | A * | 12/1993 | Lafferty | 320/101 |
| 5,304,917 | A * | 4/1994 | Somerville | 320/148 |
| 5,311,112 | A * | 5/1994 | Creaco et al. | 320/119 |
| 5,332,927 | A * | 7/1994 | Paul et al. | 307/66 |
| 5,710,506 | A * | 1/1998 | Broell et al. | 320/145 |
| 5,717,309 | A * | 2/1998 | Cho | 320/125 |
| 5,929,538 | A * | 7/1999 | O'Sullivan et al. | 307/66 |
| 5,949,216 | A * | 9/1999 | Miller | 320/125 |
| 5,955,867 | A * | 9/1999 | Cummings et al. | 320/107 |
| 6,057,666 | A * | 5/2000 | Dougherty et al. | 320/104 |
| 6,194,877 | B1 * | 2/2001 | Judge et al. | 322/28 |
| 6,353,306 | B1 * | 3/2002 | Mixon | 320/160 |
| 6,414,465 | B1 * | 7/2002 | Banks et al. | 320/118 |
| 6,441,584 | B1 * | 8/2002 | Crass | 320/131 |
| 6,476,509 | B1 * | 11/2002 | Chen et al. | 290/1 R |
| 6,495,992 | B1 * | 12/2002 | Pavlovic | 320/161 |
| 6,515,456 | B1 * | 2/2003 | Mixon | 320/160 |
| 6,690,140 | B2 * | 2/2004 | Larson | 320/104 |
| 6,784,635 | B2 * | 8/2004 | Larson | 320/104 |
| 6,835,481 | B2 * | 12/2004 | Dickman et al. | 429/19 |
| 6,888,337 | B2 * | 5/2005 | Sawyers | 320/103 |
| 6,979,507 | B2 * | 12/2005 | Edlund et al. | 429/23 |
| 7,098,627 | B2 * | 8/2006 | Nishida | 320/159 |
| 7,112,891 | B2 * | 9/2006 | Johnson et al. | 290/1 A |
| 7,116,079 | B2 * | 10/2006 | Bayne et al. | 320/116 |
| 7,245,032 | B2 * | 7/2007 | Willets et al. | 290/1 A |
| 7,245,034 | B2 * | 7/2007 | Johnson | 290/1 A |
| 7,250,231 | B2 * | 7/2007 | Edlund | 429/23 |
| 7,274,975 | B2 * | 9/2007 | Miller | 700/295 |
| 2003/0056506 | A1 * | 3/2003 | Cutcher | 60/398 |
| 2003/0057919 | A1 * | 3/2003 | Yang | 320/152 |
| 2003/0197491 | A1 * | 10/2003 | Harmon | 322/28 |
| 2003/0206050 | A1 * | 11/2003 | Huard et al. | 327/540 |
| 2003/0224833 | A1 * | 12/2003 | Egan et al. | 455/572 |
| 2004/0012264 | A1 | 1/2004 | Burger et al. | 307/64 |
| 2005/0134047 | A1 | 6/2005 | Schumacher et al. | 290/1 |
| 2005/0245291 | A1 | 11/2005 | Brown et al. | 455/572 |

FOREIGN PATENT DOCUMENTS

FR  2 689 333  10/1993

OTHER PUBLICATIONS

Baratka et al., "50 W Photovoltaic System for Electronic Control Unit," Conference Proceedings Article, Oct. 15, 1989, pp. 1-3.
The International Search Report and Written Opinion from Application No. PCT/US2006/016322, filed Apr. 28, 2006.

* cited by examiner

CHARGING SYSTEM FOR FIELD DEVICES

CROSS-REFERENCE TO RELATED APPLICATION

The present application is based on and claims the benefit of U.S. provisional patent application Ser. No. 60/675,647, filed Apr. 28, 2005, the content of which is hereby incorporated by reference in its entirety.

BACKGROUND OF THE INVENTION

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices used in the measurement, control and monitoring of industrial processes.

Field devices are used by the process control and measurement industry for a variety of purposes. Usually, such devices have a field-hardened enclosure so that they can be installed outdoors in relatively rugged environments and are able to withstand climatalogical extremes of temperature, humidity, vibration, mechanical shock, etc. These devices also can typically operate on relatively low power. For example, field devices are currently available that receive all of their operating power from a known 4-20 mA loop.

Some field devices include a transducer. A transducer is understood to mean either a device that generates an output based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Moreover, digital devices also do not require separate wiring for each field device. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device is manufactured to include an internal battery or storage cell that can be potentially charged by a solar cell. One of the challenges for charging circuits that are coupled to photovoltaic solar panels arises due to the widely varying voltage of the panel. At low light levels (less than 5000 lux), small solar panels may only provide 1 to 20 milliwatts. Conversely, under full sun conditions, the same panel may output 1-2 watts. Existing solar charging systems are designed to optimize power output when mounted where they will be illuminated by direct sunlight. If the solar panel must be located in an area which receives no direct sunlight, these existing systems do not operate efficiently and the size and cost of the solar panel must be dramatically increased to generate sufficient power. Providing a charging circuit for wireless field devices that can efficiently store energy from a widely varying energy generator, such as a solar panel, would allow more standardized solar panels or generators to be used for a variety of solar applications.

SUMMARY

A charging circuit for field devices is disclosed. The circuit has at least three modes and automatically shifts between the modes depending on voltage of the generator. In a first mode, the charging circuit provides voltage regulation. In a second mode, the charging circuit couples the generator directly to an energy storage device. In a third mode, the charging circuit decouples the generator from the storage device. A field device utilizing the charging circuit is also disclosed.

DETAILED DESCRIPTION

While embodiments of the present invention will generally be described with respect to field devices that communicate wirelessly, those skilled in the art will recognize that embodiments of the present invention can be practiced with any field device that requires additional electricity than that otherwise available to it. A wireless field device may need to derive all of its operating power from a solar panel, or other form of generator, and thus would reap significant benefits from embodiments of the present invention. However, even a wired field device that requires more power than available to it through its wired connection, could derive additional power via embodiments of the present invention.

Figure 1:
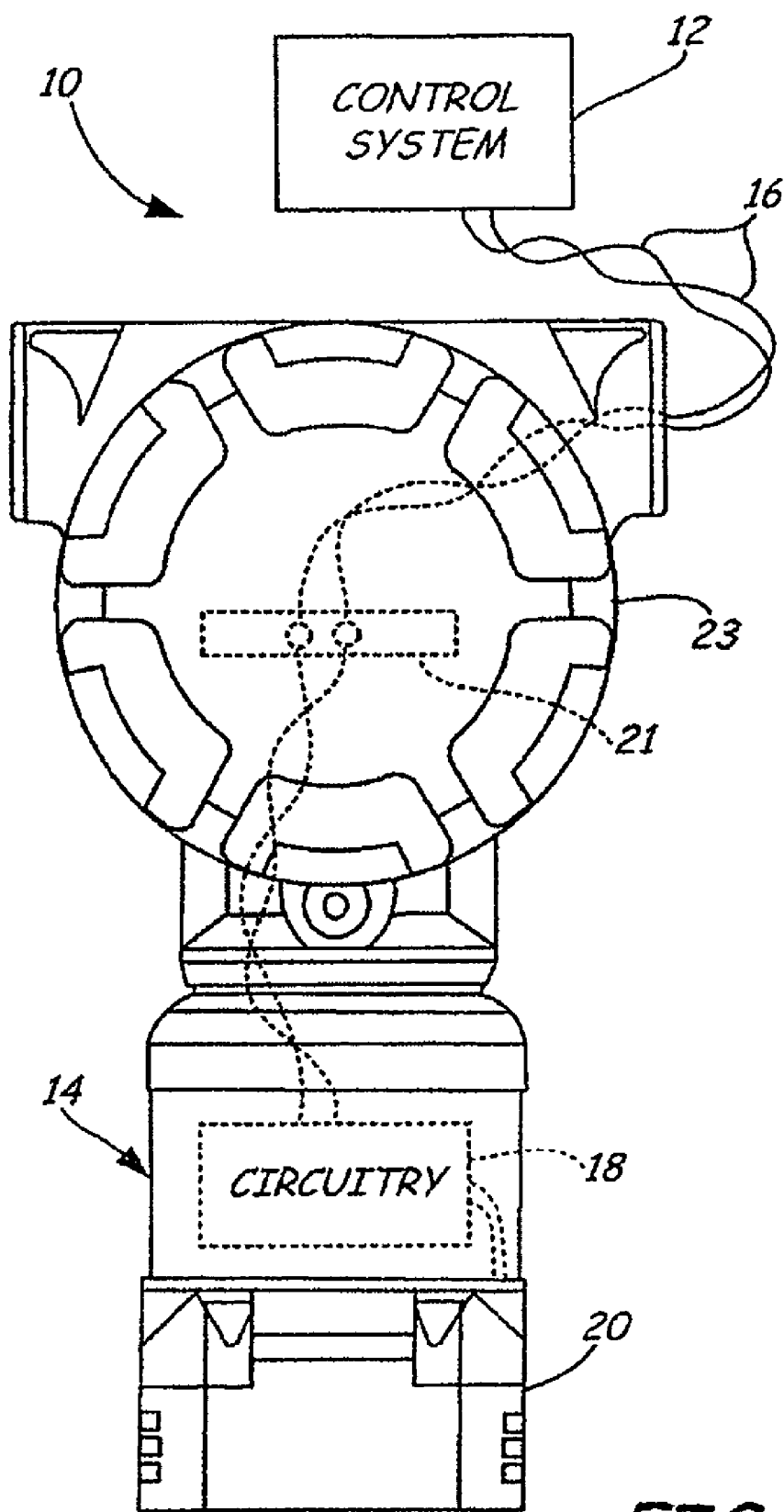
FIGS. 1 and 2 are diagrammatic and block diagram views of an exemplary field device with which embodiments of the present invention are useful.
Figure 2:
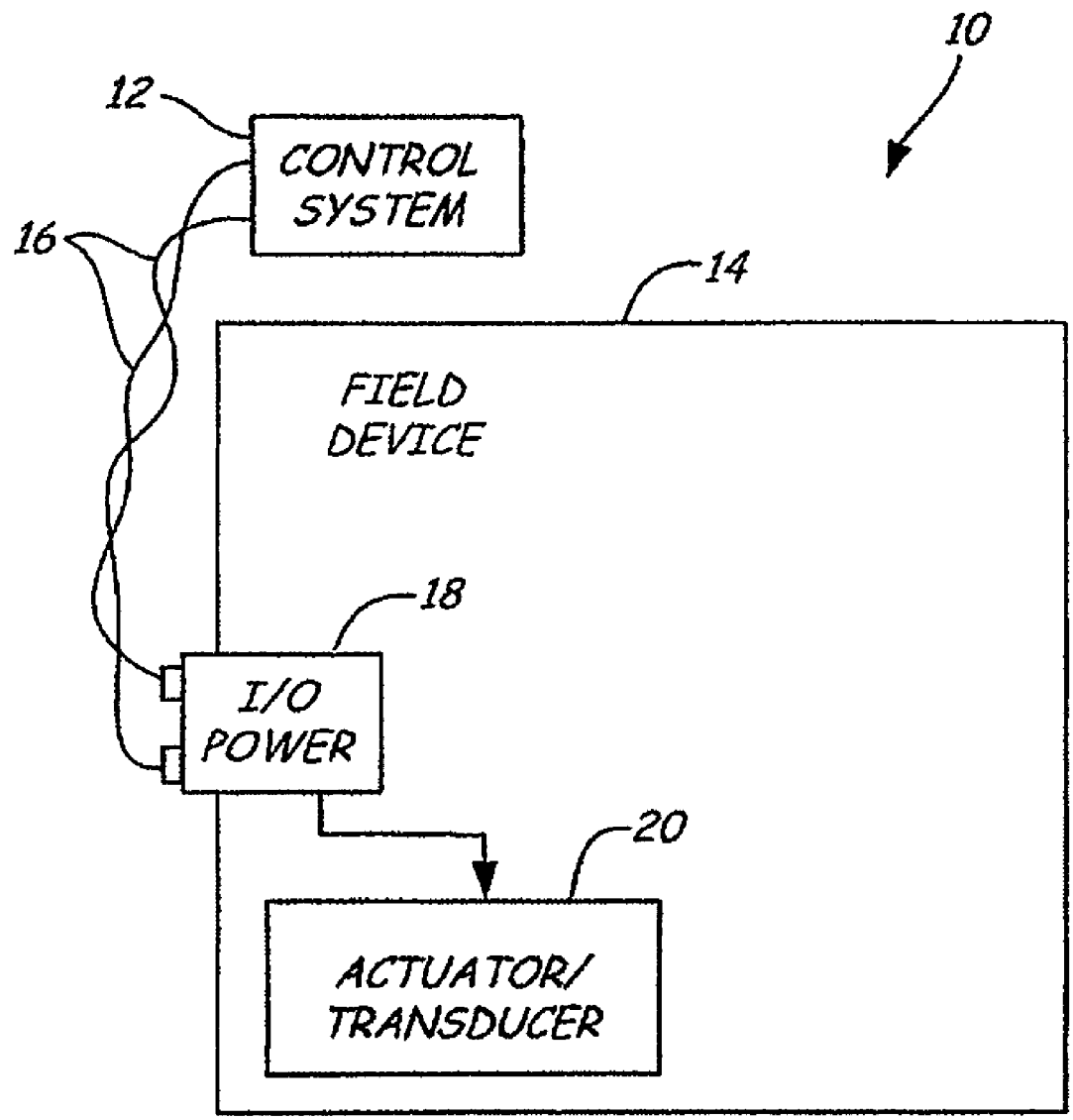

FIGS. 1 and 2 are diagrammatic and block diagram views of an exemplary wired field device with which embodiments of the present invention are useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication, such as the Highway Addressable Remote Transducer (HART®) standard, as well as all-digital protocols such as the FOUNDATION™ Fieldbus standard. Generally, process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable (PV) generator in that it couples to a process and senses an aspect, such as temperature, pressure, pH, flow, et cetera of the process and provides an indication thereof. Other examples of field devices include valves, actuators, controllers, and displays.

Generally, field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference.

Figure 3:
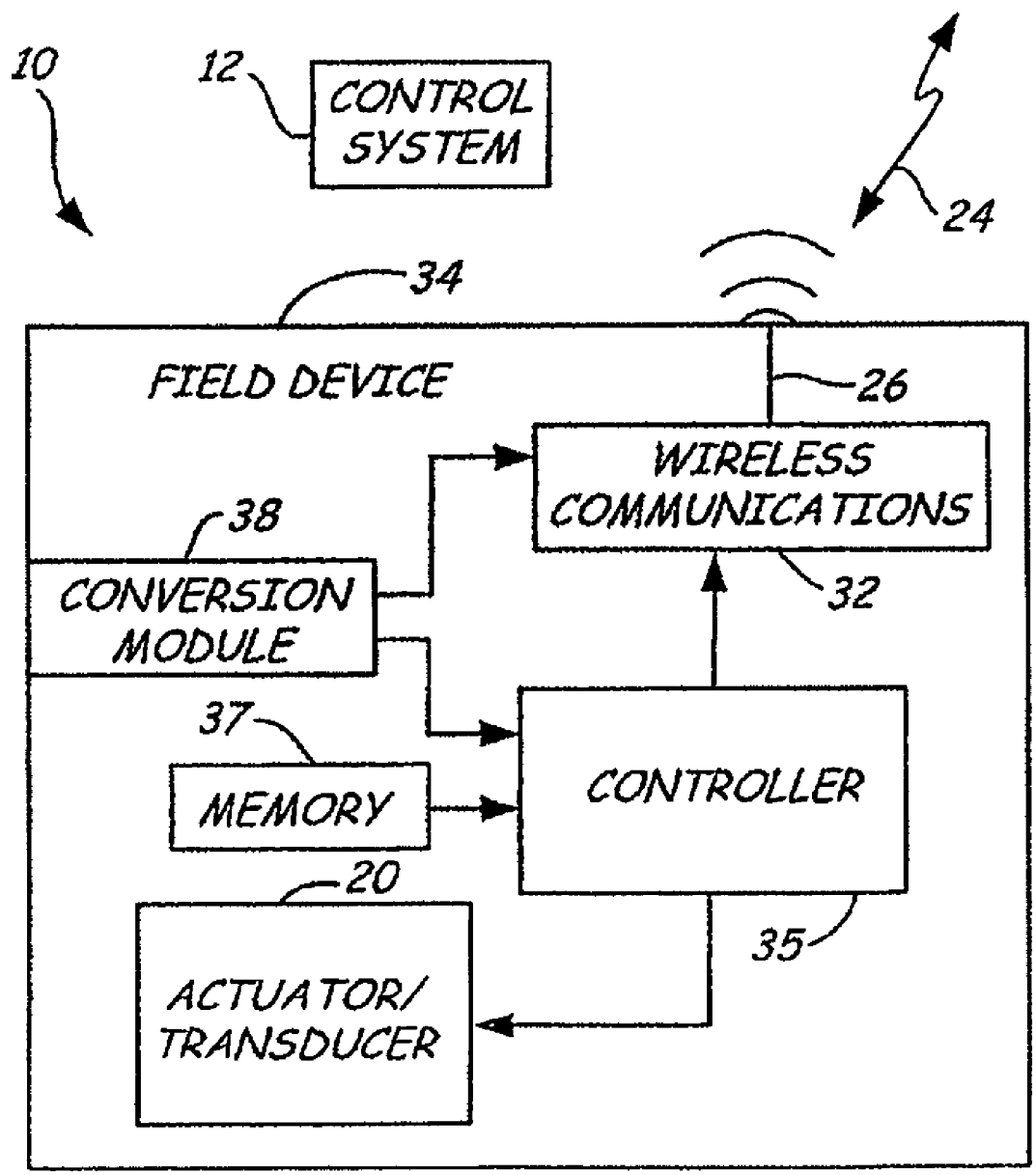
FIG. 3 is a block diagram of a wireless field device with which embodiments of the present invention are useful.

FIG. 3 is a block diagram of a wireless field device with which embodiments of the present invention are particularly useful. Field device 34 includes power conversion module 38, controller 35, wireless communications module 32, and actuator/transducer 20. Conversion module 38 can be any device that is able to convert potential energy into electrical energy. Accordingly, conversion module 38 can include a photvoltaic solar panel and associated charging circuit coupled to an energy storage device, such as a battery. Conversion module 38 can be any device, known or later developed, that translates potential energy into electricity for use by field device 34. For example, module 38 can employ known techniques to generate electricity from thermal potential energy, wind energy, pressurized gas, or other forms of potential energy. Conversion module 38 can provide power for wireless communications module 32 alone, other portions of field device 34, or may even wholly power field device 34.

Wireless communications module 32 is coupled to controller 35 and interacts with external wireless devices via antenna 26 based upon commands and/or data from controller 35. Wireless communications module 32 can communicate process-related information as well as device-related information. Depending upon the application, wireless communication module 32 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), wireless networking technologies in accordance with IEEE 802.15.4, or any other suitable wireless technology. Further, known data collision technology can be employed such that multiple units can coexist within wireless operating rage of one another. Such collision prevention can include using a number of different radio-frequency channels and/or spread spectrum techniques.

Wireless communications module 32 can also include transceivers for a plurality of wireless communications methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Figure 4:
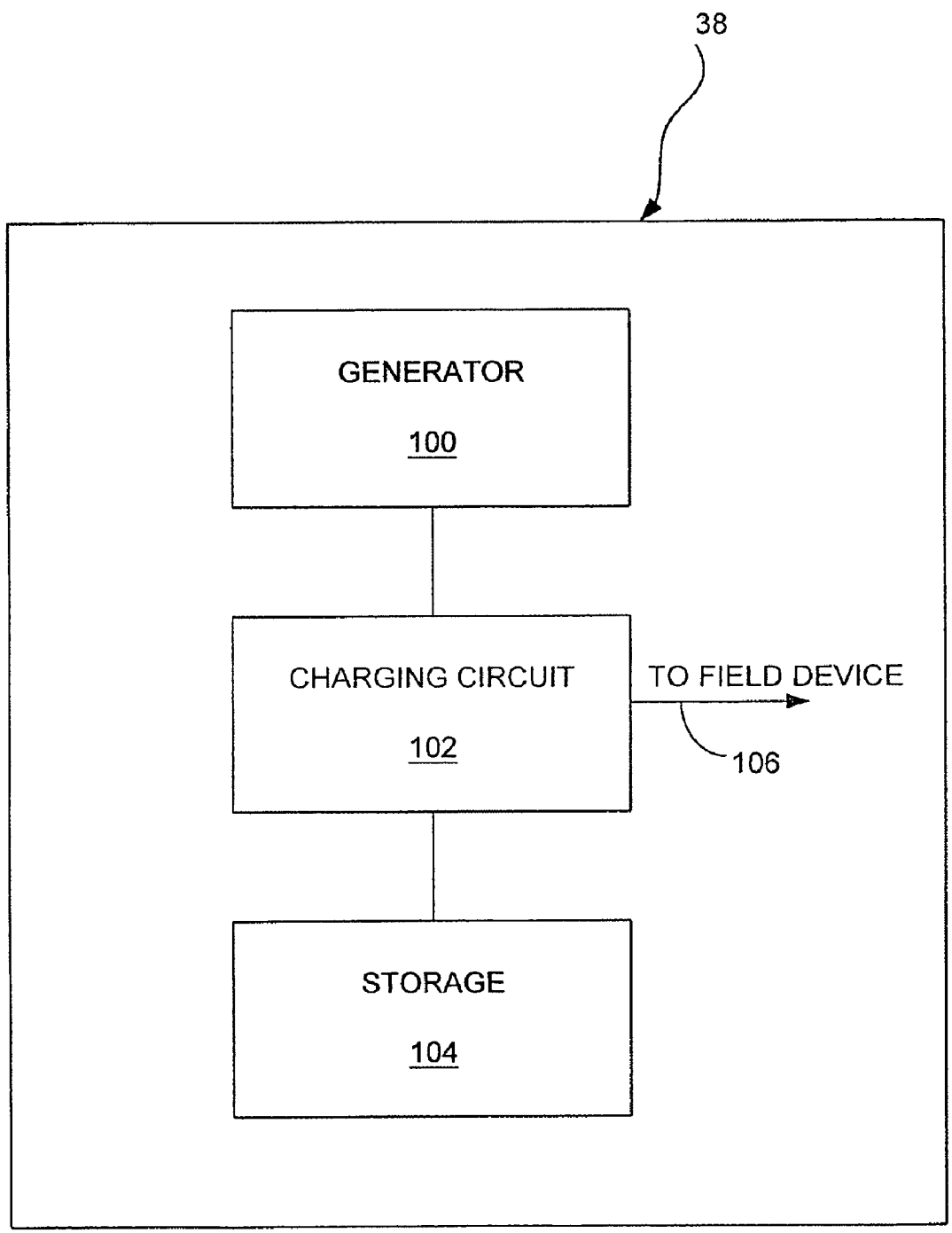
FIG. 4 is a diagrammatic view of conversion a power module in accordance with an embodiment of the present invention.
Figure 5:
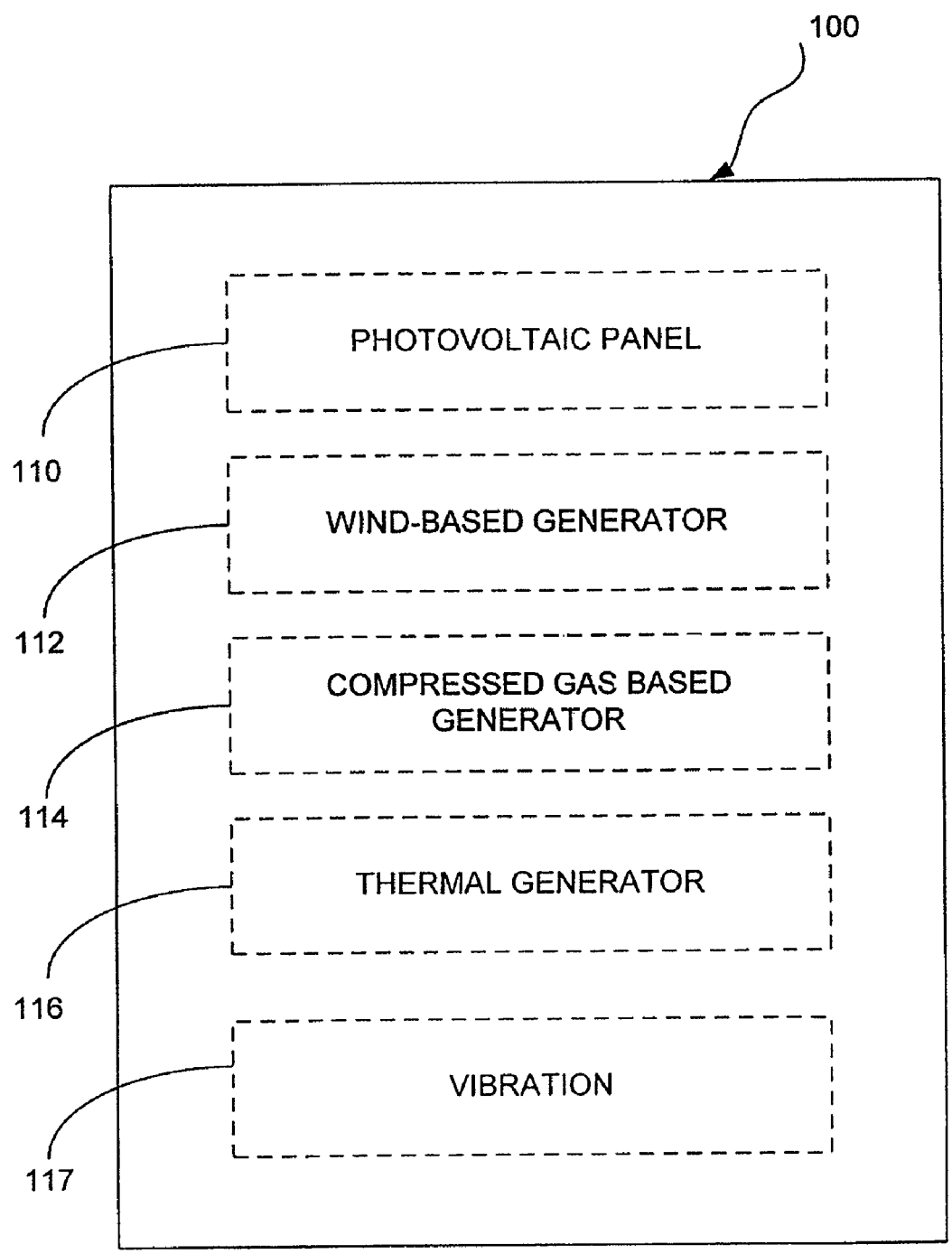
FIG. 5 is a diagrammatic view of a generator showing various options for electricity generation that can be used in accordance with embodiments of the present invention.

FIG. 4 is a diagrammatic view of conversion module 38 in accordance with an embodiment of the present invention. Conversion module 38 includes electricity generator 100 coupled to charging circuit 102 which, in turn, is coupled to energy storage device 104. Charging circuit 102 provides a power output 106 for utilization by a field device. Generator 100, as illustrated in FIG. 5, can include one or more individual generator modules. For example, generator 100 can include photovoltaic panel 110, wind-based generator 112, compressed-gas based generator 114, thermal generator 116, vibration-based generator 117, or any combination thereof. Conversion module 38 may be embodied within a field device, or disposed externally to a field device and electrically coupled to the field device to provide power to the field device. Energy storage device 104, coupled to charging circuit 102, can be any suitable device that is able to store electrical energy for any useable period of time. For example, storage device 104 may be a rechargeable battery, such as a gel cell lead-acid battery, or any suitable type of capacitor, such as a super capacitor.

Figure 6:
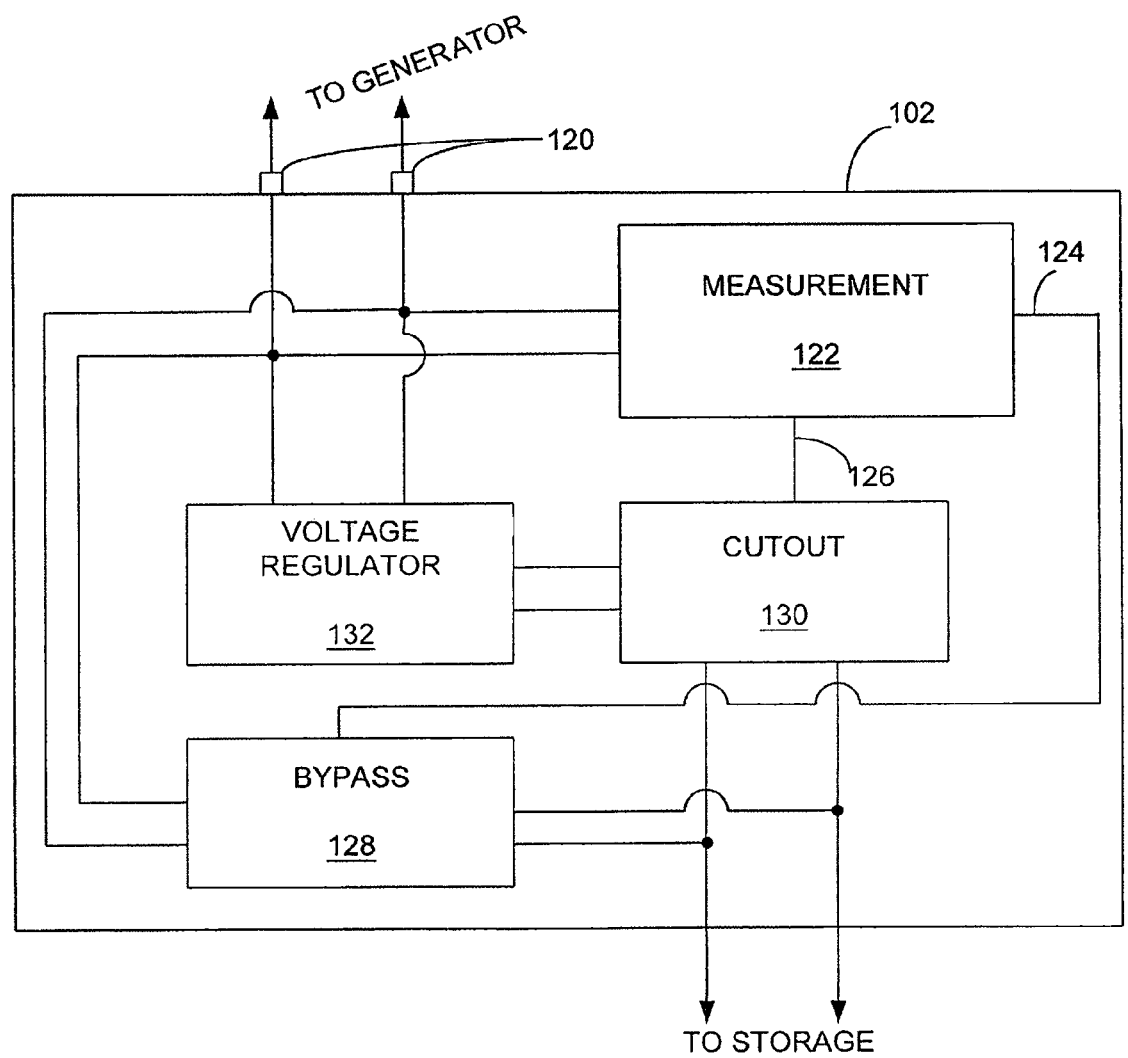
FIG. 6 is a more detailed block diagram of a charging circuit in accordance with an embodiment of the present invention.

FIG. 6 is a more detailed block diagram of charging circuit 102 in accordance with an embodiment of the present invention. Charging circuit 102 includes a plurality of conductors 120 that couple to generator module 100. Charging circuit 102 includes measurement module 122 that is coupled to conductors 120 and is adapted to provide an indication of whether a voltage present across conductors 120 exceeds first and/or second voltage thresholds. Measurement circuit 122 can be any suitable device that is able to provide a signal in response to a voltage magnitude measured across conductors 120. Measurement module 122 can include an analog-to-digital converter, a comparator circuit, a source of one or more reference potentials, or any combination thereof. Measurement module 122 provides for operation of charging circuit 102 in at least three modes. In a first mode, measurement circuit 122 sets both outputs 124 and 126 to a low or disengaged state. Accordingly, neither bypass 128 nor cutout 130 are engaged. Accordingly, energy from generator 100 flows through conductors 120 into voltage regulator 132, which provides linear voltage regulation to storage device 104. When measurement circuit 122 determines that the voltage across conductors 120 has fallen below a first threshold (bypass threshold), measurement circuit 122 engages bypass 128 to effectively couple conductors 120 to storage device 104 without passing through voltage regulator 132. In this mode, the entire charging circuit 102 is designed to consume less than 200 microwatts. This provides highly efficient operation in conditions where electrical output from the generator is diminished, such as a solar panel or photovoltaic cell operating in shade.

When the voltage measured across conductors 120, by measurement circuit 122, falls below a second, lower, threshold (cutout threshold), measurement circuit 122 distinguishes bypass 128 via line 124 and instead engages cutout 130 through line 126 to complexly decouple storage device 104 from the charging circuit. In this mode, for example, when a solar panel is operating at night, circuitry 102 functions to prevent storage device 104 from discharging back through the generator 100.

Figure 7:
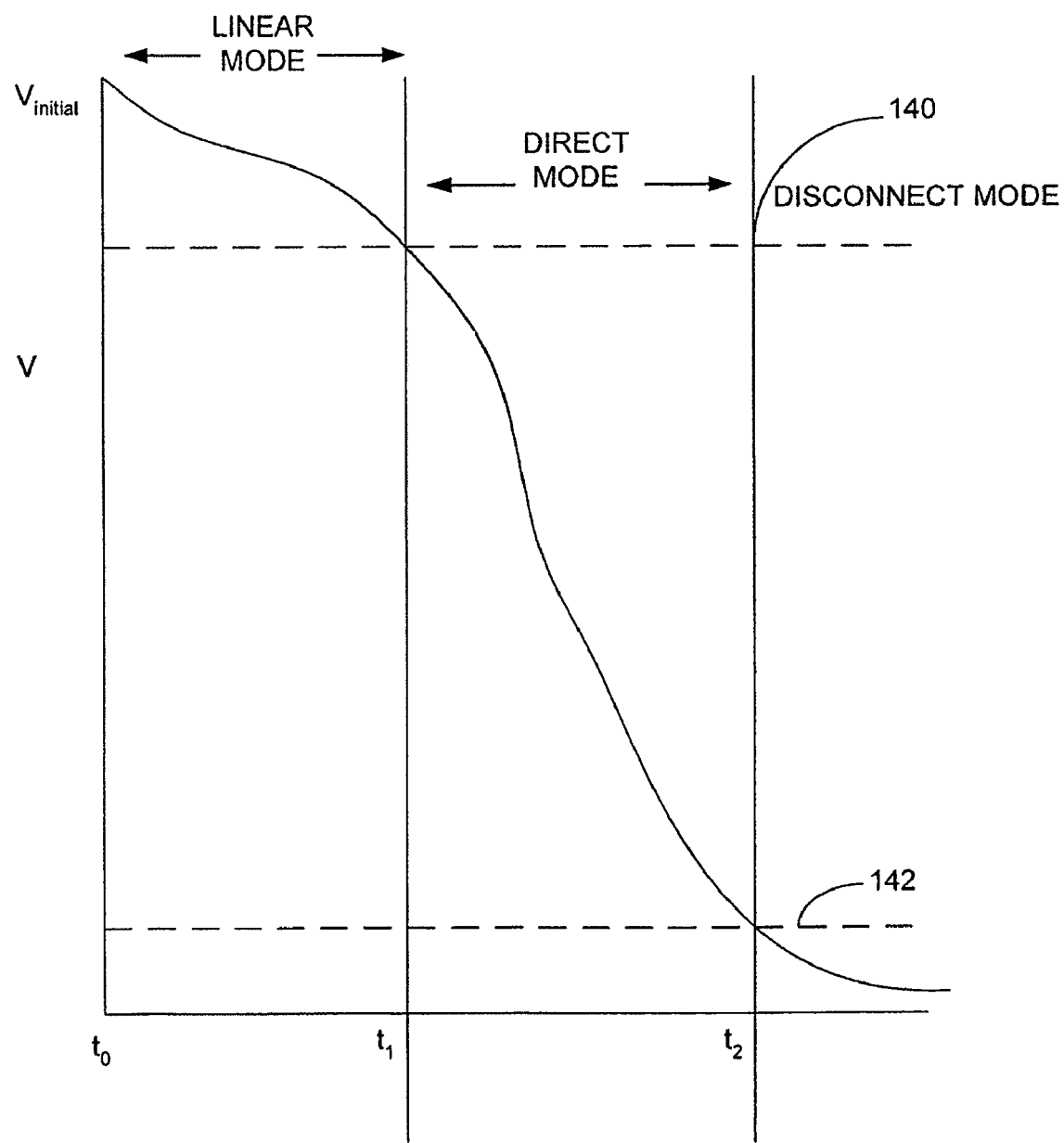
FIG. 7 is a diagrammatic view of generator voltage versus time illustrating the various charging circuit modes in accordance with embodiments of the present invention.

FIG. 7 is a diagrammatic view of generator voltage versus time illustrating the various charging circuit modes in accordance with embodiments of the present invention. At time $t_0$, the generator voltage is $V_{initial}$ and since $V_{initial}$ exceeds bypass threshold 140, the charging circuit operates in linear mode. In this mode, the charging circuit provides a regulated voltage output to the storage device. At time $t_1$, the voltage from the generator crosses bypass threshold 140 and charging circuit 102 enters "direct" mode. In this mode, the charging circuit directly couples the generator to the storage device while operating on as little energy as possible. For example, the circuitry of charging circuit 102 is designed to consume less than 200 microwatts of power in this mode. Finally, at time $t_2$, the voltage of the generator crosses cutoff threshold 142 and charging circuit 102 enters disconnect mode. In this mode, the storage device is completely decoupled from the generator. This ensures that the storage device does not discharge back through the generator.

Figure 8:
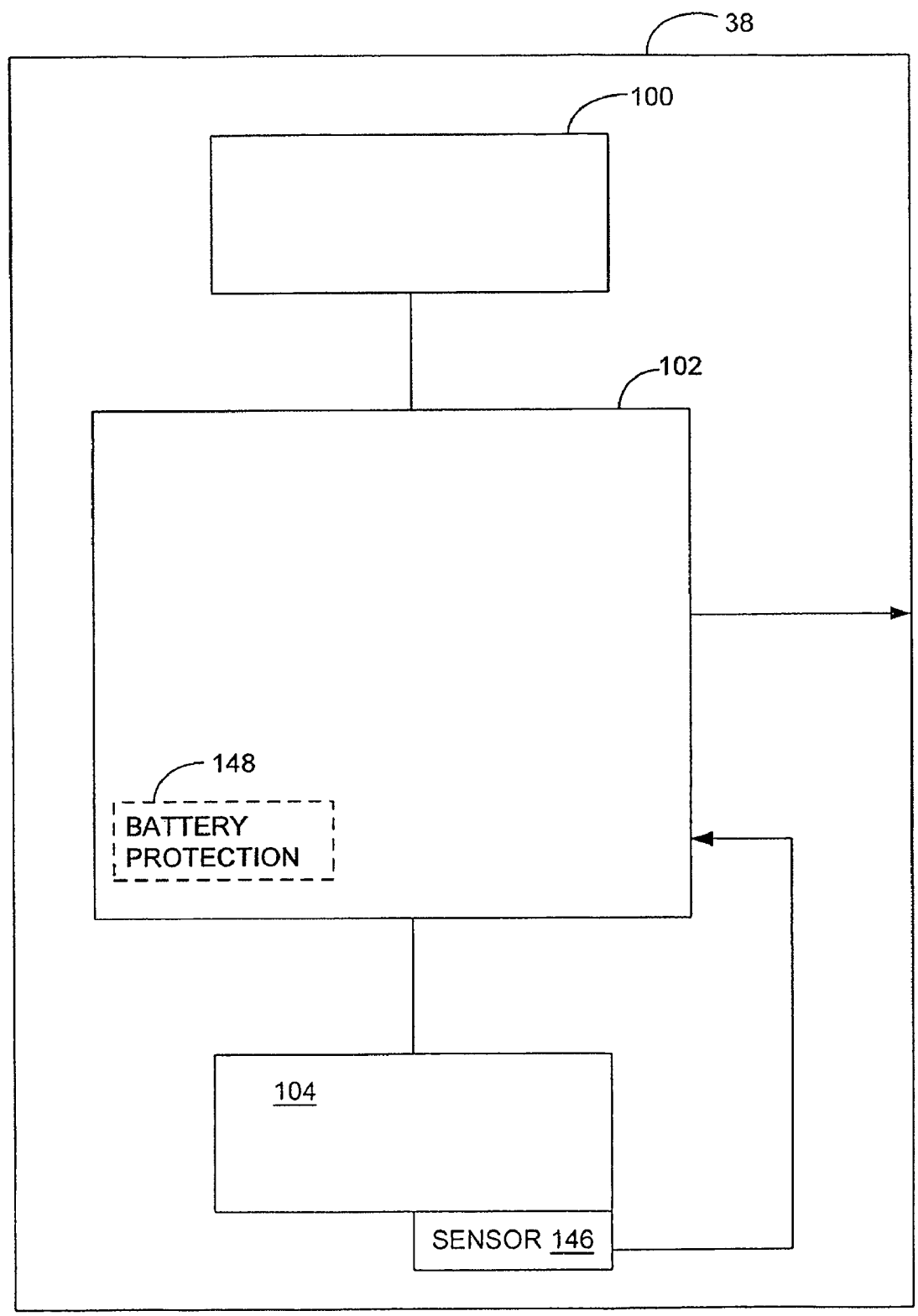
FIG. 8 illustrates energy conversion module 38 in accordance with another embodiment of the present invention.

FIG. 8 illustrates energy conversion module 38 in accordance with another embodiment of the present invention. The embodiment illustrated in FIG. 8 is particularly appropriate where storage device 104 is a gel cell lead acid battery. Such batteries can be damaged by overcharging. In order to address this potential problem, temperature sensor 146 is thermally coupled to battery 104. Sensor 146 is electrically coupled to charging circuit 102 such that charging circuit 102 can limit the charge voltage to a safe float value regardless of ambient temperature. FIG. 8 also illustrates optional battery protection circuitry 148 (illustrated in phantom) within charging circuit 102. Battery protection circuitry 148 can include any circuitry that helps extend battery life and/or diagnose any faults in battery 104. For example, battery life can be reduced if the battery is subjected to short circuits, or if the battery voltage is allowed to drop too low. Accordingly, battery protection circuitry 148 can include circuitry that is able to detect when the battery voltage is threatening to drop too low, and will inhibit any further draw of electricity from the battery. Additionally, battery protection circuitry 148 can include current limiting circuitry, or circuitry that is able to measure the amount of current drawn from battery 104 and inhibit, or reduce such current if it becomes excessive.

Although the present invention has been described with reference to preferred embodiments, workers skilled in the art will recognize that changes may be made in form and detail without departing from the spirit and scope of the invention.

What is claimed is:

1. A charging system for a field device, the charging system comprising:
    an electrical generator disposed to generate electricity from a source of potential energy;
    a charging circuit coupled to the generator and disposed to measure a voltage output of the generator;
    an electrical storage device coupled to the charging circuit; and
    wherein the charging circuit includes an output to provide power to the field device, and wherein the charging circuit is configured to operate in a plurality of modes based upon the voltage output of the generator.

2. The charging system of claim 1, wherein the charging circuit has a linear mode wherein the charging circuit provides a regulated output to the storage device.

3. The charging system of claim 2, wherein the charging circuit is in linear mode when the voltage output of the generator is above a bypass threshold.

4. The charging system of claim 1, wherein the charging circuit has a bypass mode wherein the generator is coupled directly to the storage device.

5. The charging system of claim 4, wherein the charging circuit consumes no more than 200 milliwatts in the bypass mode.

6. The charging system of claim 4, wherein the charging circuit is in bypass mode when the voltage output of the generator is below the bypass threshold and above a cutout threshold.

7. The charging system of claim 1, wherein the charging circuit has a cutout mode wherein the charging circuit decouples the storage device from the generator.

8. The charging system of claim 1, wherein the charging circuit is in cutout mode when the voltage output of the generator is below a cutout threshold.

9. The charging system of claim 1, wherein the generator includes a photovoltaic cell.

10. The charging system of claim 1, wherein the generator includes at least one of a wind-based generator module, a thermal generator module, a compressed-gas based generator, and a vibration-based generator.

11. The charging system of claim 1, wherein the electrical storage device is a rechargeable battery.

12. The charging system of claim 11, wherein the rechargeable battery is a gel cell lead acid battery.

13. The charging system of claim 12, and further comprising a temperature sensor operably coupled to the gel cell lead acid battery and to the charging circuit, and wherein the charging circuit limits charging current based upon a temperature of the gel cell lead acid battery.

14. The charging system of claim 1, and further comprising battery protection circuitry.

15. A field device comprising:
    a transducer operably coupleable to a process;
    a controller coupled to the transducer;
    a communications module coupled to the controller and configured to provide process communications functions;
    an energy conversion module configured to provide electrical energy to the field device, the energy conversion module including:
        an electrical generator disposed to generate electricity from a source of potential energy;
        a charging circuit coupled to the generator and disposed to measure a voltage output of the generator;
        an electrical storage device coupled to the charging circuit; and
        wherein the charging circuit includes an output to provide power to the field device, and wherein the charging circuit is configured to operate a plurality of modes based upon the voltage output of the generator.

16. The field device of claim 15, wherein the communications module is a wireless communications module.

17. The field device of claim 15, wherein the generator includes a photovoltaic cell.

18. The field device of claim 15, wherein the charging circuit has at least three operating modes.

19. The field device of claim 15, wherein the electrical storage device is a gel cell lead acid battery.

20. The field of claim 19, and further comprising a temperature sensor operably coupled to the gel cell lead acid battery and to the charging circuit, and wherein the charging circuit limits charging current based upon a temperature of the gel cell lead acid battery.

* * * * *